Figure 1:
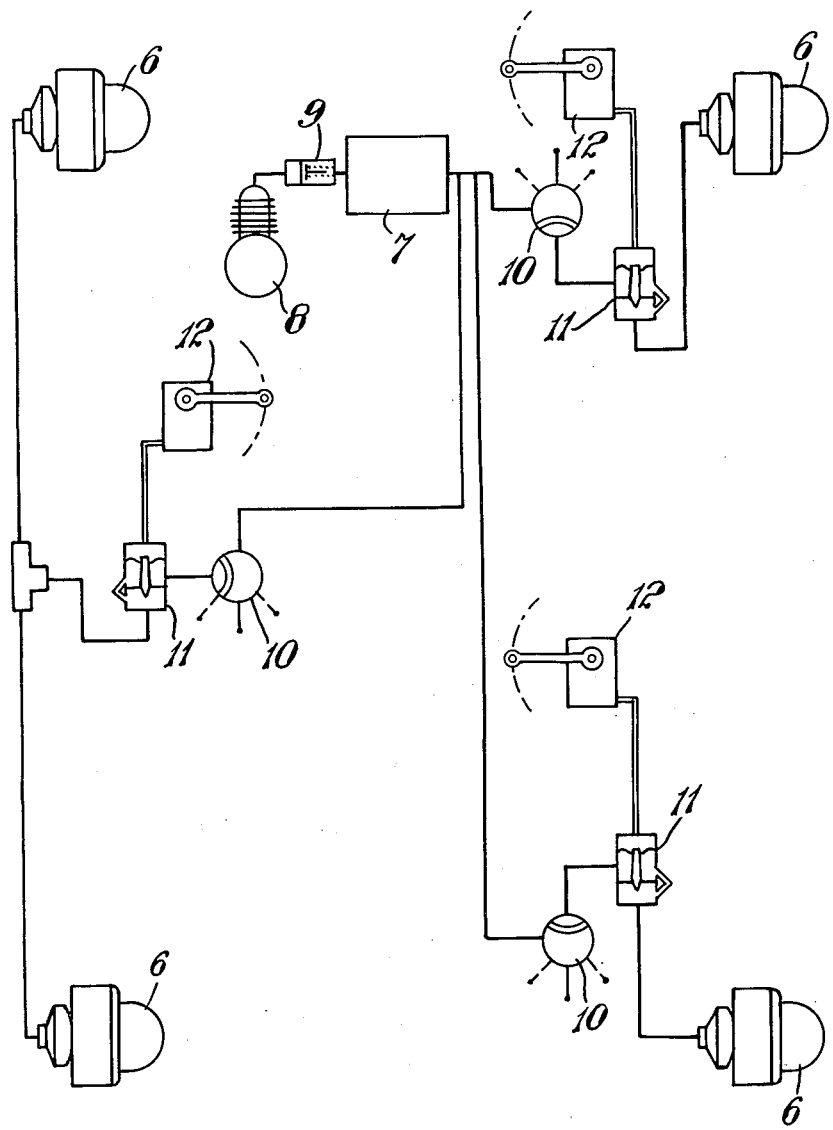

Nov. 13, 1962　　　R. J. DAVIES ET AL　　　3,063,734
CONTROL SYSTEM FOR PNEUMATIC SUSPENSIONS FOR VEHICLES
Filed May 6, 1960　　　3 Sheets-Sheet 3

INVENTORS
RAYMOND JOHN DAVIES
BERNARD FERNAND DIDIER PACAUD
by Benj. T. Rauber
his attorney

United States Patent Office 3,063,734
Patented Nov. 13, 1962

3,063,734
CONTROL SYSTEM FOR PNEUMATIC SUSPENSIONS FOR VEHICLES
Raymond John Davies and Bernard Fernand Didier Pacaud, Coventry, England, assignors to Dunlop Rubber Company Limited, London, England, a British company
Filed May 6, 1960, Ser. No. 27,365
Claims priority, application Great Britain May 6, 1959
6 Claims. (Cl. 280—124)

In a vehicle having a pneumatic suspension unit it is necessary to provide a levelling valve, which operates automatically in response to changes in level of the sprung portion of the vehicle to admit air or exhaust it from the suspension unit and so maintain the sprung portion of the vehicle at a predetermined level in relation to the axle.

The levelling valve sometimes has a built-in time delay, to prevent it from responding to transient changes in level occurring during travel as the result of vibration or unevenness of the road surface, as otherwise an excessive amount of air is consumed. According to the invention, there is no necessity for the levelling valve to be damped and a flow control valve is provided between the levelling valve and the suspension unit, the control valve being remotely operable under fluid pressure control so as to permit either fast or slow flow of air between the levelling valve and the suspension unit.

The flow control valve is preferably actuated automatically so that, when the vehicle is in motion, it restricts the flow of air between the levelling valve and the suspension unit so that, notwithstanding the fact that the levelling valve is being constantly operated, the loss of air is very small. When, however, the vehicle is stationary the flow control valve assumes its alternative position in which, it permits a free flow of air to and from the suspension unit and so enables the levelling valve rapidly to correct changes in level arising from changes in loading of the vehicle.

The system may accordingly include means for automatically supplying fluid pressure to the control valve to cause it to restrict the flow of air through it when the vehicle is in motion but not when the vehicle is stationary, the flow control valve returning automatically to a position permitting the free flow of air when said fluid pressure is relieved.

Thus the flow control valve may receive its signal from fluid pressure acting on a pressure sensitive device, e.g. a piston or diaphragm, associated with the valve. For automatic operation, the fluid pressure for moving the valve from the fast to the slow position can be derived from an automatic gear box which develops sufficient pressure to move the valve to the slow position when the vehicle attains a predetermined speed or from a road damper which applies pressure to the valve only when the vehicle is moving. When the vehicle is stationary the fluid pressure is removed from the valve, which is returned by a spring to the fast position.

The flow control valve may form part of the levelling valve or of the damper, or the flow control valve, levelling valve and damper may form a single unit. If desired the supply of operating fluid pressure to the flow control valve may be controlled manually, e.g. by a solenoid-operated valve.

Certain embodiments of flow control valve according to the invention will now be described in more detail, by way of example, with reference to the accompanying drawings, in which FIGURE 1 shows diagrammatically a typical pneumatic suspension system according to the invention, and FIGURES 2 to 5 are sections through four alternative forms of flow control valve.

Like reference numerals indicate like parts throughout the figures.

The system shown in FIGURE 1 includes four suspension units 6 which are supplied with compressed air from an accumulator 7 through levelling valves 10. As is well known the levelling valves 10 admit air from the accumulator to the suspension units when the level of the sprung portion of the vehicle falls below a predetermined value and bleed air from the suspension units to exhaust when said level exceeds the predetermined value.

The accumulator 7 is supplied with air from a pump 8 through a non-return valve 9.

Between each levelling valve 10 and its associated suspension unit or units 6 is a flow control valve 11 which normally permits of free flow of air through it. When, however, the vehicle is travelling, road dampers 12 apply fluid pressure to the flow control valves 11 and cause them to move to alternative positions in which they permit of restricted flow only of air through them.

Figure 2:
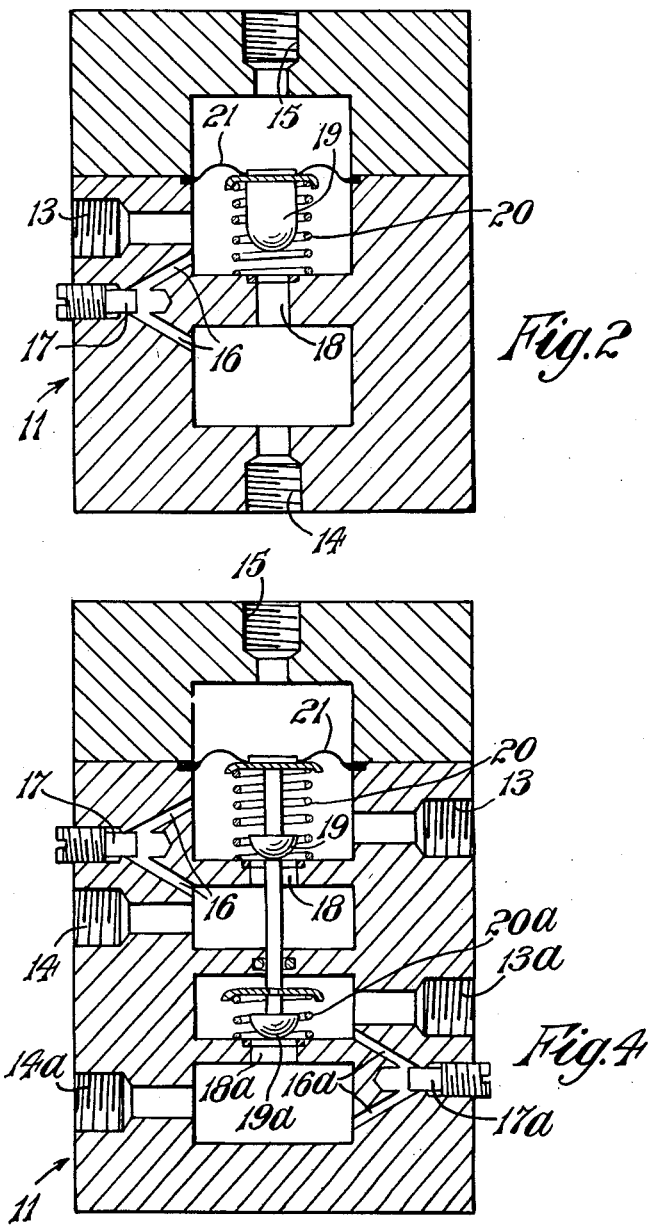

The casing of the flow control valve 11 shown in FIGURE 2 includes an inlet 13 for connection to a levelling valve 10, an outlet 14 for connection to a suspension unit 6, and a fluid pressure inlet 15 for connection to a damper 12.

Two alternative passages are provided in parallel in the casing for the flow of air between the inlet 13 and the outlet 14. One passage 16 is permanently open and is restricted by an adjustable restrictor 17 so that it provides a restricted air flow only. The other passage 18 when open, provides unrestricted air flow but is capable of being closed by a valve head 19 which is normally held open by a spring 20. Attached to the valve head 19 is a diaphragm 21 and on application of sufficient fluid pressure to the inlet 15 the valve head 19 will move to close the passage 18, so leaving the restricted passage 16 only available for air to flow through the valve casing.

In applicants' system the valve element is closed by the damper or shock absorber of the vehicle suspension and therefore operates when there is a road shock, which is the only time this valve closure is needed. In applicants' system the levelling control is thus always in action except on road shock.

Figure 3:
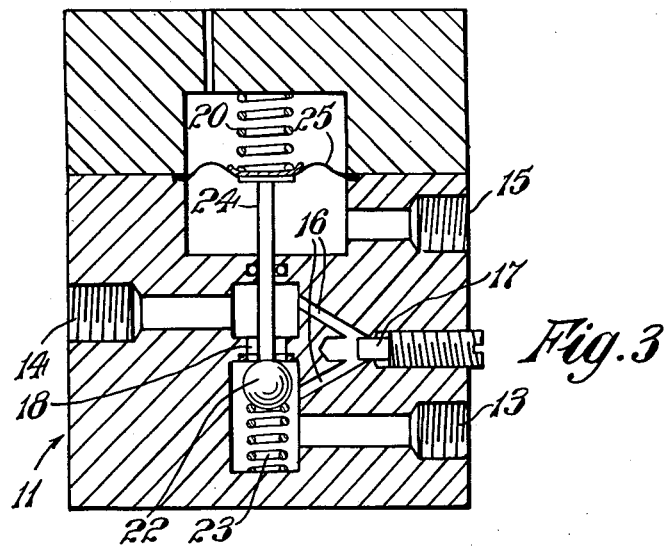

The construction shown in FIGURE 3 is generally similar to that just described, but in this case the valve head is a ball 22 which is urged by a spring 23 in the direction to close the passage 18 providing unobstructed flow of air. A push rod 24 attached to a diaphragm 25 bears on the end of the ball and a stronger spring 26 acting on the remote surface of the diaphragm 25 normally holds the valve open through the agency of the push rod 24. On admission of fluid under pressure to the inlet 15, the diaphragm 25 is lifted to permit the spring 23 to close the valve. This construction has the advantage that application of excessive fluid pressure to the diaphragm 25 will not result in application of excessive load to the valve seat.

The constructions of flow control valves shown in FIGURES 2 and 3 may be modified to control the flow of air between two levelling valves and associated air springs by the provision of two valves coupled to the diaphragm and arranged to open or close passages for providing unobstructed flow of air through the valve casing according as to whether the diaphragm is relieved of fluid pressure or not, each passage having in parallel with it a permanently open passage providing restricted flow of air.

Figure 5:
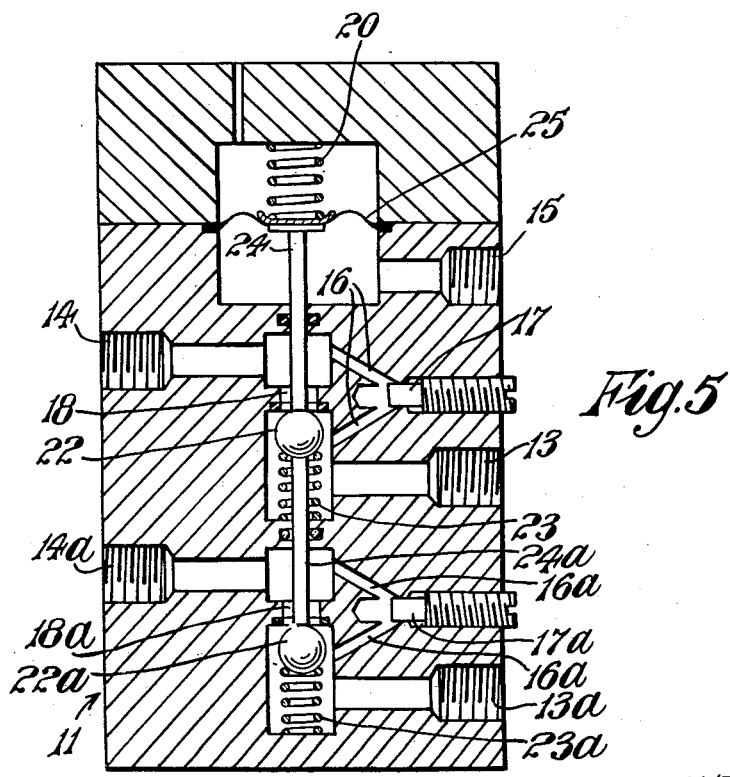

Such constructions are shown in FIGURES 4 and 5 resectively in which the reference numerals assigned to parts associated with the passage of air between the second inlet 13a from a levelling valve and the second outlet 14a to a suspension unit are the same as those assigned to parts associated with the passage of air between 13 and 14 but bear the suffix a.

Having now described our invention, what we claim is:

1. A pneumatic suspension for a vehicle which includes a pneumatic suspension unit; a levelling valve for controlling the supply of air to the suspension unit so as to maintain the level of the sprung portion of the vehicle at a predetermined value and a flow control valve between the levelling valve and the suspension unit, said flow control valve having restricted passage permanently open and providing a restricted flow only and a passage in parallel with said restricted passage and providing a free flow, a valve element operable to close said unrestricted passage, and a damper connected to said flow control valve to supply fluid under pressure to move said valve element to close said unrestricted passage when actuated by road shock.

2. A pneumatic suspension for a vehicle which comprises a pneumatic suspension unit, a levelling valve for controlling the supply of air to the suspension unit so as to maintain the level of the sprung portion of the vehicle at a normal value and a fluid actuated flow control valve between the levelling valve and the suspension unit, said flow control valve having two passages for air in parallel, one permanently open and providing a restricted flow, the other when open providing a free flow and a fluid pressure damper actuated by motion of the vehicle to supply pressure fluid to close said flow control valve.

3. The pneumatic suspension of claim 2 in which said flow control valve comprises a valve seat for said valve element and said valve element comprises a valve head movable axially of said unrestricted passage to seat on said valve seat and a spring positioned to move said valve element away from said valve seat.

4. The pneumatic suspension of claim 3 in which said flow control valve comprises a diaphragm exposed to fluid pressure of said damper and connected to said valve element.

5. The pneumatic suspension of claim 4 in which said valve element has a rounded end seating on said valve seat.

6. The pneumatic suspension of claim 2 comprising a valve seat for said fluid control valve, a valve element to seat on said valve seat, a spring to press said valve element from said valve seat and a diaphragm exposed to pressure fluid from said damper to move said valve element to said valve seat.

References Cited in the file of this patent

UNITED STATES PATENTS

| | | |
|---|---|---|
| 2,787,475 | Jackson | Apr. 2, 1957 |
| 2,857,172 | Jones | Oct. 21, 1958 |
| 2,925,284 | Szostak | Feb. 16, 1960 |